July 1, 1958   W. H. F. W. NEUSCHAEFER ET AL   2,841,230
WHEEL SUSPENSION OF MOTOR VEHICLES
Filed March 12, 1956                                      2 Sheets-Sheet 1

INVENTORS
WERNER H. F. W. NEUSCHÄFER
HANS K. HIRTH
BY
ATTORNEYS.

July 1, 1958   W. H. F. W. NEUSCHAEFER ET AL   2,841,230
WHEEL SUSPENSION OF MOTOR VEHICLES
Filed March 12, 1956                              2 Sheets-Sheet 2

INVENTORS
WERNER H. F. W. NEUSCHÄFER
HANS K. HIRTH
BY
ATTORNEYS.

United States Patent Office 2,841,230
Patented July 1, 1958

2,841,230

WHEEL SUSPENSION OF MOTOR VEHICLES

Werner H. F. W. Neuschaefer, Kirchheim, Teck, and Hans K. Hirth, Stuttgart-Bad Cannstatt, Germany, assignors to Daimler-Benz Aktiengesellschaft, Stuttgart-Unterturkheim, Germany Application March 12, 1956, Serial No. 570,745

Claims priority, application Germany March 12, 1955

7 Claims. (Cl. 180—73)

The present invention relates to the wheel suspension of motor vehicles and, more particularly, to a wheel suspension of the type in which a pair of half axles is pivotally mounted by resilient means on the body of the vehicle for oscillation about a common substantially horizontal axis extending lengthwise of the vehicle.

In a wheel suspension of this type, the resilient mounting means afford a certain freedom of inclination to the axis of oscillation of the half axles with respect to its normal horizontal disposition. Where such inclination becomes excessive, for instance under the effect of driving or braking couples, it results in an undesirable departure of the wheels from the direction of travel whereby the safe adherence of the wheels to the road is jeopardized and the wear of the tires is increased.

It is the object of the present invention to improve the resilient pivotal mounting of the half axles so as to limit the freedom of the pivotal axis of inclination to a minimum without, however, substantially reducing the resiliency of the mounting in lengthwise direction with respect to the vehicle.

Broadly speaking, it is an object of the invention to provide an improved wheel suspension involving independently sprung half axles which results in superior riding qualities, is simple and reliable in operation, and is subject to a minimum of wear.

Further objects of our invention will appear from a detailed description of a preferred embodiment thereof following hereinafter with reference to the drawings. It is to be understood, however, that the terms and phrases used in such detailed description have been chosen for the purpose of illustrating the invention rather than that of restricting or limiting the same, the features of novelty for which patent protection is sought, being set forth in the appended claims.

Figures 4, 5:
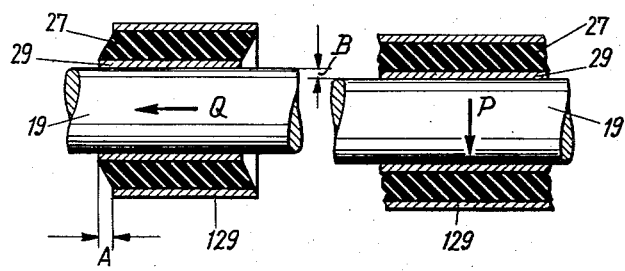
Fig. 4 is an axial section taken through a resilient bearing illustrating the reaction thereof to an axial thrust.
Fig. 5 is a sectional view of the resilient bearing shown in Fig. 4 illustrating the reaction thereof to a transverse force.

The body of the motor vehicle includes a chassis frame comprising a plurality of longitudinal and transverse members, such as a pair of longitudinal box-shaped sheet metal members 10 and 11 and transverse members 12 and 13 rigidly connected therewith. Hence, the term "vehicle body" as used herein embraces both, the chassis frame and the superstructure rigid therewith which may or may not be separable from the chassis frame. The member 13 is rigidly connected to the upturned ends of the longitudinal members 10 and 11 by interposed sheet metal brackets 13a and 13b welded to both the longitudinal members and the transverse member 13. Between the transverse members 12 and 13, the longitudinal members 10 and 11 are provided with outwardly extending arms 14 and 15 rigidly welded thereto for a purpose to be described later. An arm 28 is welded to the inside of the longitudinal frame member 10 substantially in registry with the arm 14 and extends inwardly and downwardly. Its end is formed with a bearing sleeve 30 having a horizontal axis located substantially in the vertical central plane of the vehicle and below the axes of the wheels 16 at a substantial distance from such axes. A similar bearing sleeve 130 is formed by the central depressed portion of the transverse member 13 and is axially aligned with the sleeve 30. A horizontal pivot pin 19 is located between the arm 28 and the transverse member 13 and extends lengthwise of the vehicle substantially in the central vertical plane thereof. The ends of such pin 19 are mounted within the sleeves 30 and 130 by resilient cushioning means. In the embodiment shown, each of such cushioning means is formed by a bushing 27 of rubber or of a rubberlike plastic. Preferably the rubber sleeve is lined on its inside with a sheet metal sleeve 29 seated on the end of pin 19 and on its outside with a sheet metal sleeve 129 seated in the sleeve 30 or 130, respectively, and is preferably bonded to the inner and outer sheet metal sleeves 29 and 129 by vulcanization or otherwise. The pin 19 is secured against axial displacement in the sheet metal sleeves 29 by heads 119 and by other means to be described later. Similarly the sleeves 129 are secured in the sleeves 30 and 130 against displacement by suitable means such as peening. Therefore, the pin 19 may be displaced a distance A, Fig. 4, by an axial force Q acting on the pin owing to the shearing flexure of the rubber bushing 27 as shown in Fig. 4. Also pin 19 may be transversely displaced a distance B by a transverse force P owing to radial compression of the rubber bushing on one side of the pin and radial expansion on the other side of the pin. Preferably, each of the rubber bushings 27 is so dimensioned that were the forces Q and P are equal the radial deflexion B is but a small fraction of the axial deflection A. Due to this fact and due to the comparatively large distance between the arm 28 and the transverse member 13, the pin 19 has no freedom of any substantial inclination to its normal horizontal disposition under the effect of any couples tending to depress one end and to raise the other end of the pin.

A pair of half axles 17 and 18 carrying the wheels 16 journalled on the ends thereof are pivotally mounted on the pin 19 for oscillation. For this purpose the half axle 17 is bifurcated and its bifurcations 20 and 21 are formed with eyes 120 and 121 which are journalled on the pin 19 in contact with the inner sheet metal sleeves 29 thereof.

The other half axle 18 is formed with an axle transmission housing 24 and the latter is formed with an eye 23 that is mounted on the pin 19 intermediate the eyes 120 and 121 and in contact therewith. Preferably the eye 23 is rigidly connected with the pin 19 by a transverse pin 25 for common rotation and axial displacement.

Shafts 38 and 40 are connected to the wheels 16 and extend therefrom through the hollow half axles into the housing 24 and are geared therein to suitable transmission means (not shown) driven by a universal shaft 36 having a universal joint 37. The shaft 38 surrounded by the half axle 17 includes a universal joint surrounded by a flexible corrugated rubber jacket 39 having one end fixed to the half axle 17 and the other end fixed to the housing 24, such jacket being embraced by the bifurcations 20 and 21. In this manner, the wheel 16 may be driven through the universal shaft 36, the transmission means in the housing 24 and the shafts 38 and 40 extending through the half axles 17, 18 to the wheels 16.

Figure 3:
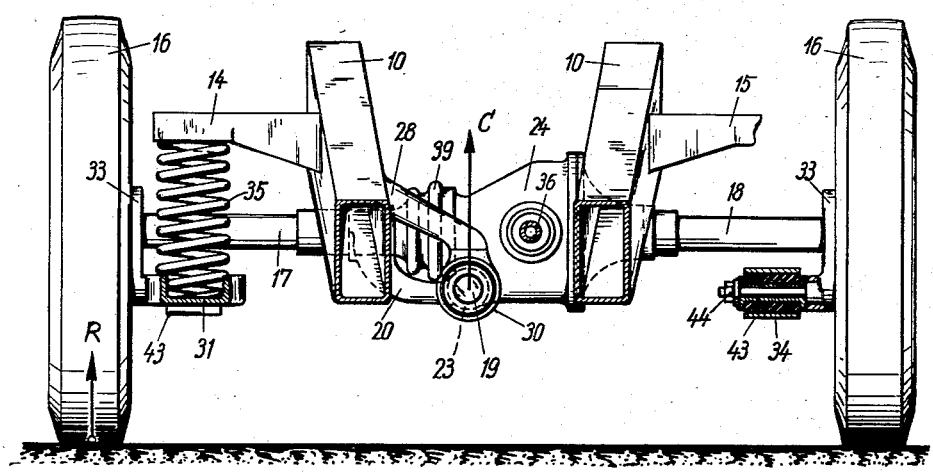
Fig. 3 is the vertical section taken along the line 3—3 of Fig. 1.

The half axles are braced against lengthwise thrust by a pair of lengthwise extending links 31 each link having one end pivotally connected to the body and more particularly to the transverse member 12 thereof and having its other end pivotally connected to the associated half axle. In the embodiment shown, the pivotal connection provided between the transverse member 12 and each link 31 includes an annular member 32 of rubber or the like mounted on a two-part bracket 41 depending from member 112, the parts of said bracket being connected by a bolt 42, the axis of member 32 being disposed in upright position. The link 31 is formed with an eye which surrounds the annular member 32 firmly embracing the outer periphery thereof in spaced relationship to the bracket 41. Owing to the resiliency of the rubber member 32 the link 31 may rock up and down. The rear end of the link 31 is formed with an eye 43 which surrounds a horizontal transverse pin 44 (Fig. 3) projecting beneath the associated half axle 17, or 18 respectively, from the wheel carrier 33 rigidly secured to the half axle, a rubber bushing 34 being interposed between the eye 43 and the pin 44.

Suitable springing means are interposed between the body of the motor vehicle and each of the half axles 17 and 18. In the embodiment shown, the springing means are formed by helical springs 35 interposed between the arm 14, or 15 respectively, of the chassis frame and the link 31 intermediate the ends thereof. Shock absorbers of the telescope type may be disposed inside the helical spring 35.

The pressure R acting on the wheel results in a reactionary force C exerted by the pin 19 on the inner end of the half axle. This force C is substantially equally distributed on the body of the vehicle through the rubber bushings 27 because of the substantially symmetrical mounting of the half axles by means of the hinge constituted by the pin 19, the rubber bushings 27 and the eyes 23, 120 and 121. Couples tending to turn the axial unit in a transverse plane are substantially avoided. Similarly, the reactionary couples produced by the forces driving the wheels and braking the wheels are taken up equally by the two rubber bushings 27, the leverage available therefor remaining constant independently of the oscillation of the half axles.

Figure 2:
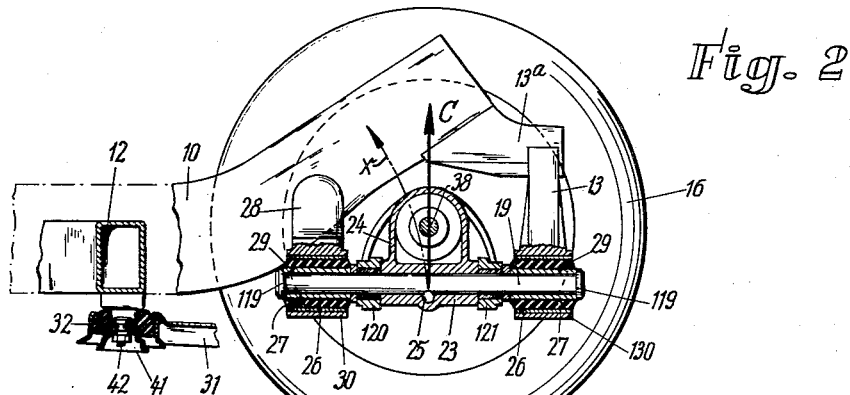
Fig. 2 is a vertical section taken along the offset planes indicated by the broken line 2—2 viewed in the direction of the arrows associated with such line in Fig. 1.
Figure 1:
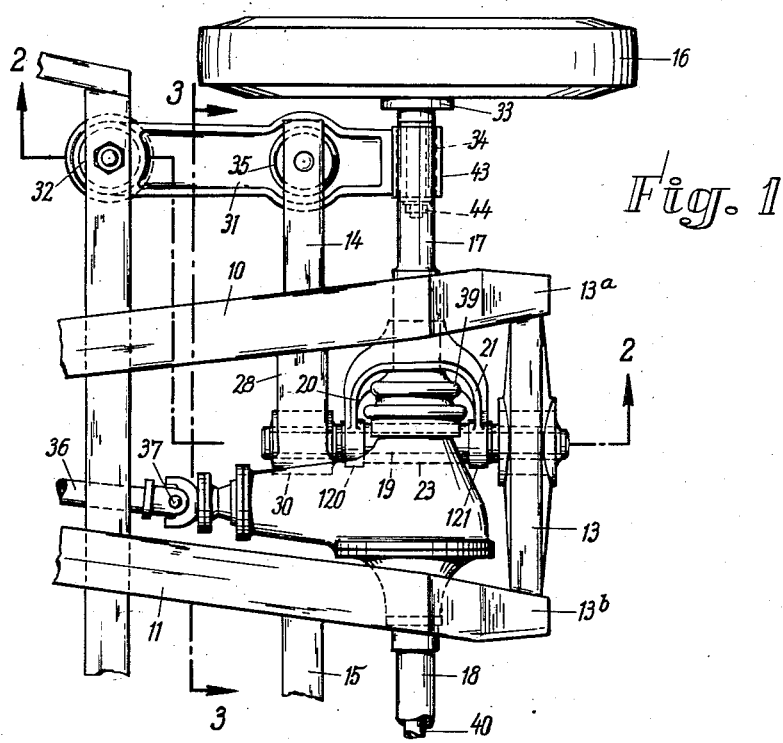
Fig. 1 is a partial plan view of the novel wheel suspension, one of the wheels and the associated springing means being broken away.

As each of the wheels in its up- and down-movement relative to the body is guided by the link 31 substantially along an arcuate path indicated by the arrow x in Fig. 2, the pin 19 is constrained to move longitudinally in response to such up- and down-movement. This is the reason why it is desirable to so dimension the bushings 27 as to permit a considerably longitudinal displacement A of the pin 19 within the eyes 30 and 130, while resisting any transverse displacement B. Therefore the axial unit will have a high stability against slanting. At the same time the cushion rings 32 ensure a certain resiliency in longitudinal direction whereby shocks occuring in the direction of travel will be absorbed in a smooth manner.

To briefly resume the essential features of the present invention it will be apparent from the above that the hinging means for the pivotal mounting of the half axles includes a pair of resilient bearings, such as 27, 29, 129, aligned with the axis of oscillation and carried by the body at points spaced from and located in front of and to the rear of the axis of the tubular axles 17 and 18. Preferably, the half axle such as 18 including the axle transmission housing 24, is mounted on the common pivot pin 19 by means of an eye 23 provided on the housing 24 whereas the other half axle 17 is mounted on the pivot pin on either side of the eye 23 by means of the bifurcations 20 and 21, the pivot pin 19 having its ends mounted on the parts 28 and 13 of the body. In a preferred embodiment of the invention, the mounting of the half axles to the body is effected by means of interposed rubber bushings 27 carrying the pivot pin 19, whereas the pin-supporting parts 13 and 28 may be rigidly connected with the body or, alternatively, may be connected therewith by slightly resilient means.

The present invention results in a stable mounting of the half axles whereby undesirable angular displacement of the axle unit is avoided and whereby braking and driving couples are taken up uniformly and effectively. The provision of the rubber bushings, such as 27, affords a universal resiliency which can be safely controlled with respect to longitudinal forces as well as transverse forces. The pin-supporting parts, such as the parts 13 and 28, of the body need not be specially reinforced in transverse direction. The half axles are prevented from any displacement which would cause the wheels to depart from the direction of travel in an undesirable manner. Moreover, the cushioning effect of the rubber bushings 27 will insulate the body effectively from the transfer of noise from the wheels.

Preferably, the pin 19 has one of its ends, particularly its rear end, supported by a transverse frame member whereas its other end is supported by an arm depending from one of the longitudinal frame members.

The invention is primarily applicable to such wheel suspensions in which the half axles are braced in the direction of travel against the body by radius links which have a pivotal or resilient connection with the half axles. The rubber bushings, such as 27, constituting the bearings of the pivot pin 19 have preferably a larger axial resiliency than radial resiliency.

While the invention has been described in connection with a preferred embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What we claim is:

1. In a vehicle, the combination comprising a vehicle body, a pair of half axles, an axle transmission housing being included in one of said axles, hinging means for hinging said pair to said body for oscillation about a common substantially horizontal axis extending lengthwise of the vehicle, wheels journalled on said half axles, driving shafts connected to said wheels and extending therefrom to said housing, and springing means interposed between said body and each of said half axles, said hinging means including a pair of resilient bearings aligned with said axis and carried by said body at points spaced from and located in front of and to the rear of the axes of said half axles.

2. The combination claimed in claim 1 in which said hinging means comprises a pin having its ends supported by said resilient bearings, an eye provided on one of said half axles and mounted on said pin between its ends and additional eyes mounted on said pin between said first mentioned eye and said bearings, the other one of said half axles being bifurcated and formed with said additional eyes on its bifurcations.

3. The combination claimed in claim 1 in which said hinging means comprises a pin, said pair of resilient bearings supporting the ends of said pin, each bearing including a bushing of rubberlike material surrounding said pin, and eyes provided on said half axles and mounted on said pin.

4. In a vehicle, the combination comprising a vehicle body having a pair of longitudinal frame members and a transverse frame member connected to said longitudinal frame members, an arm connected to at least one of said longitudinal members at a point located in front of said transverse member and spaced therefrom, a horizontal pin located between said arm and said transverse member and extending lengthwise of the vehicle substantially in the central vertical plane thereof, resilient means for mounting the ends of said pin in said transverse member and in said arm, a pair of half axles pivotally mounted on said pin, an axle transmission housing being included in one of said axles, wheels on said axles, driving shafts connected to said wheels and extending therefrom to said housing, transmission means included in said housing and geared to said shafts, and springing means interposed between said body and said half axles.

5. The combination claimed in claim 4 in which said resilient means for mounting the ends of said pin are formed by bushings of a rubberlike material surrounding the ends of said pin, said combination further comprising a bracket depending from said transverse member and being rigidly connected thereto, one of said bushings being supported by said arm and the other one being supported by said bracket, said arm being rigidly connected with one of said longitudinal members.

6. The combination claimed in claim 1 further comprising a pair of lengthwise extending links, each link having one end pivotally connected to said body and having its other end pivotally connected to one of said axles.

7. The combination claimed in claim 4 in which said resilient means for mounting the ends of said pin are formed by bushings of a rubberlike material surrounding the ends of said pin, each of said bushings having such a shape that an axial force acting on said pin will cause a larger axial shearing deformation of said bushing than the radial deformation caused by an equally strong transverse force acting on said bushing.

References Cited in the file of this patent

UNITED STATES PATENTS

| | | |
|---|---|---|
| 2,055,975 | Haltenberger | Sept. 29, 1936 |
| 2,112,628 | Lee | Mar. 29, 1938 |

FOREIGN PATENTS

| | | |
|---|---|---|
| 868,699 | Germany | Feb. 26, 1953 |
| 926,531 | Germany | Apr. 18, 1955 |